(12) United States Patent
Hattori et al.

(10) Patent No.: US 7,022,156 B2
(45) Date of Patent: Apr. 4, 2006

(54) METHOD FOR PRODUCING NANOPARTICLES OF MAGNETICALLY HARD ORDERED ALLOY PHASE

(75) Inventors: Yasushi Hattori, Kanagawa (JP); Koukichi Waki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 225 days.

(21) Appl. No.: 10/373,843

(22) Filed: Feb. 27, 2003

(65) Prior Publication Data

US 2004/0020327 A1 Feb. 5, 2004

(30) Foreign Application Priority Data

Feb. 27, 2002 (JP) ............................. 2002-051766

(51) Int. Cl.
*B22F 9/24* (2006.01)

(52) U.S. Cl. .......................................... 75/351; 75/370

(58) Field of Classification Search ................. 75/351, 75/369, 370
See application file for complete search history.

(56) References Cited

U.S. PATENT DOCUMENTS 5,589,234 A * 12/1996 Mori et al. ................. 427/597
6,262,129 B1 7/2001 Murray et al.
2004/0074336 A1* 4/2004 Daimon et al. ............... 75/365

FOREIGN PATENT DOCUMENTS

EP 0 938 728 B1 7/2002

OTHER PUBLICATIONS

Binary Alloy Phase Diagrams, vol. 2, Thaddeus B. Massalski, Editor-in-Chief, 1986, American Society for Metals, p. 2173.*

Shouheng Sun et al.; "Monodisperse FePt Nanoparticles and Ferromagnetic FePt Nanocrystal Superlattices"; Science vol. 287; Mar. 17, 2000; pp. 1989-1993.

* cited by examiner

*Primary Examiner*—George Wyszomierski
(74) *Attorney, Agent, or Firm*—Sughrue Mion, PLLC

(57) ABSTRACT

The invention provides methods for producing nanoparticles having a CuAu type or $Cu_3Au$ type magnetically hard ordered alloy phase. One method includes a step of reducing, in liquid phase, a base metal and then reducing, in liquid phase, a noble metal. Another method includes a step of reducing, in liquid phase, at first a base metal and a part of a noble metal, and then reducing, in liquid phase, a remainder of the noble metal in liquid phase.

14 Claims, No Drawings

METHOD FOR PRODUCING NANOPARTICLES OF MAGNETICALLY HARD ORDERED ALLOY PHASE

BACKGROUND OF THE INVENTION

1. Field of the Invention

The present invention relates to a method for producing magnetic particles usable in a magnetic recording medium, an MRAM or the like, and more particularly to a method for producing nanoparticles of magnetically hard ordered alloy phase.

2. Description of the Related Art

In order to increase the density of magnetic recording, a reduction in particle size is essential. For example, in a magnetic recording medium widely used, for example, in a video tape, a tape for a computer or a disk, the noise level becomes lower with a reduction in the particle size for a given mass of the ferromagnetic material.

A CuAu or $Cu_3Au$ type magnetically hard ordered alloy is a promising material for increasing the magnetic recording density since it has a high magnetocrystalline anisotropy because of a strain generated at the time of ordering and also has a hard magnetism even when the particle size is reduced.

A typical example of the CuAu type alloy is a FePt alloy. The FePt alloy is a material having the highest magnetocrystalline anisotropy constant. Consequently it is advantageous in reducing the particle size. The FePt alloy can be prepared in various methods. An example of a method for preparation in liquid phase includes a method employing iron carbonyl as an iron precursor, as described in *Science*, vol. 287, 1989(2000).

This method allows mono-dispersed FePt alloy to be obtain, and is promising in that the resultant particles are self aligned.

However, iron carbonyl is a fatal poison, and the preparation of FePt alloy utilizing such substance as the precursor requires various facilities and steps for safety, such as a ventilating facility and an exhaust gas treating facility, and therefore has inferior productivity.

SUMMARY OF THE INVENTION

In consideration of the foregoing, the present invention intends to provide a method for producing nanoparticles of a magnetically hard ordered alloy phase which method can produce a CuAu type or $Cu_3Au$ type magnetically hard ordered alloy without a toxic compound of a 0-valent base metal such as iron carbonyl.

As a result of intensive investigations, the present inventors have found that aforementioned object can be attained by the invention explained in the following.

A first aspect of the invention provides a method for producing nanoparticles having at least one of a CuAu type and $Cu_3Au$ type magnetically hard ordered alloy phase, the method comprising the step of reducing, in liquid phase, a base metal and then reducing, in liquid phase, a noble metal.

A second aspect of the invention provides a method for producing nanoparticles having at least one of a CuAu type and $Cu_3Au$ type magnetically hard ordered alloy phase, the method comprising the step of: reducing, in liquid phase, a base metal and a part of a noble metal, and then reducing, in liquid phase, the remainder of the noble metal.

The nanoparticles of magnetically hard ordered alloy phase produced by either of the aforementioned producing methods is preferably used in a magnetic layer of a magnetic recording medium and the like.

The present invention can provide a method for producing nanoparticles of a magnetically hard ordered alloy phase, which method can produce a CuAu type or $Cu_3Au$ type magnetically hard ordered alloy without a toxic compound of a 0-valent base metal such as iron carbonyl. Such producing method can maintain a high productivity, since it does not require various facilities and steps for safety, such as a ventilating facility and an exhaust gas treating facility.

DETAILED DESCRIPTION OF THE PREFERRED EMBODIMENTS

<Method for Producing Nanoparticles of a Magnetically Hard Ordered Alloy Phase>

The method for producing nanoparticles of a magnetically hard ordered alloy phase (hereinafter also simply called "nanoparticles") of the present invention at least includes a reducing step of reducing, in a liquid phase, a metal having a low oxidation-reduction potential (standard electrode potential) (such metal may be hereinafter called "base metal") and a metal having a high oxidation-reduction potential (such metal may be hereinafter called "noble metal") with a reducing agent or the like. In the reducing step, the base metal is reduced first and then the noble metal is reduced, or the base metal and a part of the noble metal are reduced first and then the remainder of the noble metal is reduced.

By reducing the base metal first, the noble metal is reduced by the base metal and, as a result, the base metal is oxidized, and both metals are relatively uniformly incorporated in particles, and composition of each particle becomes uniform. On the other hand, in case the noble metal is reduced first, there is obtained so-called core/shell structure in which the noble metal constitutes a core and the base metal constitutes a shell.

Also in case of reducing the base metal first and then reducing the entire amount of the noble metal, there may be formed a core area in which the concentration of the base metal is high.

Therefore, a more uniform composition can be obtained by reducing the base metal and a part of the noble metal first.

Stable magnetic characteristics, such as coercive force which is affected by the composition, are obtained by making composition uniform.

Examples of composition of the CuAu type magnetically hard ordered alloy include FeNi, FePd, FePt and CoPt. Among them, FePd, FePt and CoPt are preferable. In particular, FePt is most preferable because of its a high magnetic anisotropy constant.

Examples of composition of the $Cu_3Au$ type ferromagnetic ordered alloy include $Ni_3Fe$, $FePd_3$, $Fe_3Pt$, $FePt_3$, $CoPt_3$, $Ni_3Pt$, $CrPt_3$, and $Ni_3Mn$. Among them, $FePd_3$, $FePt_3$, $CoPt_3$, $Fe_3Pd$, $Fe_3Pt$ and $Co_3Pt$ are preferable.

As the noble metal (metal having an oxidation-reduction potential of at least −0.2 V), Pt, Pd and Rh are preferable, and it is possible to use solutions in which $H_2PtCl_6.6H_2O$, $Pt(CH_3COCHCOCH_3)_2$, $RhCl_3.3H_2O$, $Pd(OCOCH_3)_2$, $PdCl_2$, $Pd(CH_3COCHCOCH_3)_2$ or the like is dissolved in a solvent. The metal concentration in the solution is preferably within a range from 0.1 to 1000 μmol/ml, and more preferably from 0.1 to 100 μmol/ml.

As the base metal (metal having an oxidation-reduction potential of less than −0.2 V), Co, Fe, Ni and Cr are preferable and Fe and Co are more preferable. These metals may be used as solutions obtained by dissolving $FeSO_4.7H_2O$, $NiSO_4.7H_2O$, $CoCl_2.6H_2O$, $Co(OCOCH_3)$ $_2.4H_2O$ or the like in a solvent. The metal concentration in the solution is preferably within a range from 0.1 to 1000 µmol/ml, and more preferably from 0.1 to 100 µmol/ml.

It is also preferable to reduce a transformation temperature to the magnetically hard ordered alloy by adding a third element such as Sb, Pb, Bi, Cu, Ag or Zn to a binary alloy. An amount of the third element is preferably within a range of 1 to 20 at % of the entire amount (binary alloy+the third element), and more preferably 5 to 15 at %.

A solvent to be employed in the liquid phase can be an organic solvent or water, or a mixture of an organic solvent and water.

The organic solvent can be an alcohol or a polyhydric alcohol, and examples of the alcohol include methanol, ethanol and butanol, while examples of the polyhydric alcohol include ethylene glycol and glycerin.

In the reducing step, in order to precipitate out a base metal and a noble metal in this order with a reducing agent, it is preferable to employ a reducing agent having an oxidation-reduction potential which is lower than −0.2 V (vs. N.H.E) thereby reducing the base metal, or the base metal and a part of the noble metal, and then to add the obtained solution after the reduction to a solution containing the noble metal and to reduce the noble metal with a reducing agent having an oxidation-reduction potential which is at least −0.2 V (vs. N.H.E). Thereafter, if necessary, there may be added a reducing agent having an oxidation-reduction potential which is lower than −0.2 V (vs. N.H.E).

As another method for precipitating a base metal and a noble metal in this order with a reducing agent, there may be employed a method of adding in advance a large amount of a reducing agent having a high oxidation-reduction potential to a solution including at least a base metal thereby reducing the base metal only, or the base metal and a part of the noble metal, and then adding a reducing agent having a high oxidation-reduction potential to the solution thereby reducing the noble metal.

In the foregoing description, "a part of the noble metal" means ½ or less (preferably ½ to 1/10) of the entire amount of the noble metal to be reduced. Such amount can be realized by regulating amounts of raw materials of the base metal and the noble metal according to a formulation.

The oxidation-reduction potential varies depending on the pH of the system, but typical examples of the reducing agent having the oxidation-reduction potential which is at least −0.2 V (vs. N.H.E) include alcohols such as 1,2-hexadecanediol and 1,2-dodecanediol, glycerins, $H_2$ and HCHO.

Typical examples of the reducing agent having the oxidation-reduction potential which is lower than −0.2 V (vs. N.H.E) include $S_2O_6^{2-}$, $H_2PO_2^-$, $BH_4^-$, $N_2H_5^+$ or $H_2PO_3^-$.

A 0-valent base metal compound including iron carbonyl may be considered preferable as a raw material (precursor) of the base metal since such compound does not require the use of a reducing agent. However, a carbonyl compound of a 0-valent base metal is generally hazardous to the human body and the environment and thus needs a ventilating facility and an exhaust gas treatment facility, thereby reducing the productivity. A reducing step as employed in the method of the present invention requires hardly any consideration regarding the human body and the environment, thereby maintaining a high productivity.

Nanoparticles can be stably formed by use of an adsorbing agent at the time of reducing and precipitating the noble metal. A polymer or a surfactant can be preferably used as the adsorbing agent. Examples of such polymer include polyvinyl alcohol (PVA), poly-N-vinyl-2-pyrrolidone (PVP) and gelatin. Among them, PVP is particularly preferable.

A molecular weight of the porymer is preferably within a range from 20,000 to 60,000, and more preferably from 30,000 to 50,000. An amount of the polymer is preferably 0.1 to 10 times as large as the mass of the magnetically hard nanoparticles to be generated, and more preferably 0.1 to 5 times.

The surfactant to be preferably used as the adsorbing agent is preferably an "organic stabilizer" which is a long-chain organic compound represented by a general formula: R—X. In the foregoing general formula, R represents a "tail group" formed by a straight or branched hydrocarbon or fluorocarbon chain, and generally includes 8 to 22 carbon atoms. Also in the foregoing general formula, X represents a "head group" constituting a portion (X) which provides a specific chemical bond on the surface of the nanoparticles, and is preferably a sulfinate group (—SOOH), a sulfonate group (—$SO_2$OH), a phosphinate group (—POOH), a phosphonate group (—OPO(OH)$_2$), a carboxylate group or a thiol group.

The above-mentioned organic stabilizer is preferably a sulfonic acid (R—$SO_2$OH), a sulfinic acid (R—SOOH), a phosphinic acid ($R_2$POOH), a phosphonic acid (R—OPO(OH)$_2$), a carboxylic acid (R—COOH), or a thiol (R—SH). Among them, oleic acid is particularly preferable.

Oleic acid is a known surfactant in colloid stabilization, and is suitable for protection of iron-based nanoparticles. Oleic acid has a chain of 18 carbon atoms and a length of not more than 20 Angstroms (not more than 2 nm). Also oleic acid is not aliphatic but contains a double bond, and a relatively long chain of oleic acid provides a steric hindrance which is important for canceling the strong magnetic interaction between the particles.

A similar long-chain carboxylic acid such as erucic acid and linolic acid has been used like oleic acid (for example long-chain organic acids having 8 to 22 carbon atoms can be used alone or in combination), but oleic acid is preferable because it is easily available and inexpensive natural source (for example olive oil).

A combination of a phosphin and an organic stabilizer (for example a combination of triorganophosphin and an acid) exhibits an excellent controlling ability for the growth and stabilization of the particles. There may also be used didecyl ether and didodecyl ether, but phenyl ether and n-octyl ether can be advantageously used as the solvent because of their low cost and high boiling point.

In the reducing reaction in the reducing step, a reaction temperature varies depending on the desired nanoparticles and other conditions such as the boiling point of the solvent, but is preferably within a range from 40 to 360° C., and more preferably 80 to 240° C. A temperature lower than 40° C. may results in a failure in the particle growth, while a temperature higher than 360° C. may result in an uncontrolled particle growth, thus increasing formation of undesirable byproducts.

The obtained nanoparticles have a coercive force preferably within a range of 95.5 to 398 kA/m (1200 to 5000 Oe), and, when used in a magnetic recording medium, preferably within a range of 95.5 to 278.6 kA/m (1200 to 3500 Oe) from the view point of their adaptability to a recording head. The nanoparticles have a particle size preferably within a range of 1 to 100 nm, more preferably 3 to 20 nm, and particularly preferably 3 to 10 nm.

In order to increase the particle size (volume mean particle size) a seed crystal method is effective. In the case of using them in a magnetic recording medium, it is preferable to achieve a closest packing of the magnetically hard nanoparticles in order to increase the recording capacity, and, for such purpose, a size variation factor of the magnetically hard nanoparticles of the present invention is preferably less than 10%, and more preferably 5% or less.

An excessively small particle size is undesirable because such particles become superparamagnetic. Therefore, a seed crystal method is preferable in order to increase the particle size. In such a method, the base metal constituting the particles may cause reduction and precipitation of the noble metal. In such a case, there is fear of an oxidation of the particles, and it is preferable to subject the particles to a hydrogenation process in advance.

An outermost layer of the magnetically hard nanoparticles is preferably formed by the noble metal for the purpose of preventing oxidation of the particles, but, because such particles tends to aggregate, the outermost layer in the present invention is preferably formed by an alloy of the noble metal and the base metal.

The stepwise reduction of the base metal and the noble metal as in the present invention can provide an alloy of the noble metal and the base metal in the outermost layer of the particles.

After the synthesis of the magnetically hard nanoparticles, an elimination of salts from the solution is preferable in order to improve the dispersion stability of the particles. In order to desalt the solution, there may be used a method in which an alcohol is added to the solution in an excess amount to induce a slight coagulation of nanoparticles, then the nanoparticles precipitate spontaneously or are precipitated by centrifuging and the salts are removed together with a supernatant liquid, but, if coagulation is easily generated even after such a method is conducted, it is preferable to conduct an ultrafiltration depending on the necessity.

<Magnetic Recording Medium>

The nanoparticles obtained in the producing method of the invention can be preferably used in a magnetic recording medium having at least a magnetic layer, for example a magnetic tape such as a video tape and a tape for computers, or a magnetic disk such as a flexible disk and a hard disk.

A method of producing a magnetic recording medium in which the nanoparticles of the invention can be preferably used will be now described in detail.

The magnetic recording medium using the nanoparticles includes a magnetic layer, which is formed by coating a surface of a support (non-magnetic support) with a nanoparticle dispersion containing the prepared nanoparticles, and, if necessary, other layer. More specifically, the above-mentioned magnetic recording medium has a support and a magnetic layer containing the nanoparticles and a non-magnetic layer is provided between the magnetic layer and the support, if necessary.

The nanoparticle dispersion mentioned above means a solution immediately after the preparation by the producing method of the invention in which solution the nanoparticles are dispersed, or a solution formed by adding a known solvent or the like to the above-mentioned solution so as to obtain a concentration of the nanoparticles within a range from 0.01 to 0.1 mg/ml.

In case of forming a magnetic disk, it is preferable to form a magnetic layer and, if necessary, a non-magnetic layer on an opposite surface of the support.

In case of forming a magnetic tape, it is preferable to form a back layer on a surface of the support which surface is opposite to the surface bearing the magnetic layer.

In the following, there will be explained a method for producing a magnetic recording medium utilizing the nanoparticles produced by the method of the invention.

First, the nanoparticle dispersion is applied to a non-magnetic support to form a magnetic layer. The magnetic layer has a dry thickness preferably within a range from 5 nm to 5 μm, and more preferably 5 nm to 0.2 μm.

It is possible to apply coating liquids for magnetic layers in superposed manner successively or at the same time. An overwriting characteristic is improved by forming a magnetic layer having a high coercive force (Hc) as an upper layer and a magnetic layer having a low coercive force (Hc) as a lower layer. The nanoparticle dispersion can be applied for example by air doctor knife coating, blade coating, rod coating, extrusion coating, air knife coating, squeeze coating, immersion coating, reverse roll coating, transfer roll coating, gravure coating, kiss coating, cast coating, spray coating or spin coating.

The non-magnetic support can be formed by an inorganic material or an organic material. Aluminium, a Mg alloy (such as Al—Mg, and Mg—Al—Zn), glass, quartz, carbon, silicon or ceramics can be used as the inorganic non-magnetic support. These supports have an excellent impact resistance and have a rigidity suitable for a thickness reduction or a high speed rotation. Also in comparison with organic supports, they are more resistant to heat.

A polyester such as polyethylene terephthalate and polyethylene naphthalate, polyolefins, cellulose triacetate, polycarbonate, polyamide (including an aliphatic polyamide and an aromatic polyamide such as aramide), polyimide, polyamidimide, polysulfon, and polybenzoxazole can be used as the organic support.

The nanoparticles prepared from the solution (liquid phase) have disordered phase. In order to convert such a disordered phase into an ordered phase, an annealing process is needed.

In order to prevent fused adhesion of the nanoparticles, it is preferable to subject not only the magnetic layer but also the support to the annealing process after the nanoparticle dispersion is applied to the support. It is necessary that the annealing temperature is higher than an ordered phase-disorderd phase transformation temperature determined in advance with a differential thermal analyzer (DTA), and it is usually 400° C. or higher.

In case of using an organic support, it is necessary to heat the only magnetic layer with a laser beam since the support does not have a sufficient heat resistance.

A very thin protective film can be formed on the magnetic layer to improve the abrasion resistance, and a lubricant can be applied to the protective film to improve the sliding property thereof, thereby obtaining a magnetic recording medium having a sufficient reliability.

Examples of a material for the protective film include an oxide such as silica, alumina, titania, zirconia, cobalt oxide and nickel oxide; a nitride such as titanium nitride, silicon nitride and boron nitride; a carbide such as silicon carbide, chromium carbide, and boron carbide; and carbon such as graphite and amorphous carbon, and hard amorphous carbon which is generally called diamond-like carbon is particularly preferable.

A carbon protective film formed by carbon has a sufficient abrasion resistance even with a very small film thickness and does not easily burn to a sliding member, therefore carbon is suitable as the material of the protective film.

The carbon protective film is generally formed by sputtering in case of a hard disk, but, in case of a product requiring continuous film formation such as a video tape, there are proposed various methods utilizing plasma CVD which has a higher film forming speed than sputtering and it is preferable to utilize such methods. Among these, a plasma injection CVD (PI-CVD) is reported to have a very high film forming speed and to provide a high quality carbon protective film with a sufficient hardness and with reduced number of pinholes (for example JP-A Nos. 61-130487, 63-279426 and 3-113824).

The carbon protective film has preferably a Vickers hardness of 1000 kg/mm$^2$ or higher, and more preferably 2000 kg/mm$^2$ or higher. Preferably, it has an amorphous structure and is electrically non-conductive.

In case of using a diamond-like carbon film as the carbon protective film, a structure thereof can be confirmed by Raman spectroscopic analysis. More specifically, the diamond-like structure of the carbon film can be confirmed by the presence of a peak at 1520 to 1560 cm$^{-1}$ in the spectroscopic measurement. In case where the structure of the carbon film is shifted from the diamond-like structure, a peak detected in the Raman spectroscopic analysis is shifted from the above-mentioned range and a hardness of the protective film is also lowered.

A carbon-containing compound, for example an alkane such as methane, ethane, propane and butane, an alkene such as ethylene and propylene, or an alkyne such as acetylene is preferably used as a carbon source to form such a carbon protective film. Also if necessary, a carrier gas to improve the film quality such as argon, and/or a gas to improve the film quality such as hydrogen or nitrogen can be added to the carbon source.

A large thickness of the carbon protective film results in a deterioration in the electromagnetic conversion characteristics and a deterioration in the adhesion of the protective film to the magnetic layer, while a small thickness results in an insufficient abrasion resistance. Therefore, the film thickness is preferably within a range of 2.5 to 30 nm, and more preferably 5 to 10 nm.

Also, in order to improve the adhesion of the protective film to the support and to the magnetic layer, it is preferable to etch the surface of the magnetic layer in advance with an inert gas, or to reform surface of the magnetic layer by exposing to plasma of a reactive gas such as oxygen.

The magnetic layer may be composed of a plurality of layers in order to improve the electromagnetic conversion characteristics, or a known non-magnetic undercoat layer or an intermediate layer may be provided under the magnetic layer. In order to improve the durability during running and the corrosion resistance, a lubricant or an antirusting agent is preferably added to the magnetic layer or the protective film, as explained in the foregoing. A lubricant to be added can be a hydrocarbon lubricant, a fluorinated lubricant or an extreme-pressure additive which are known in the art.

Examples of the hydrocarbon lubricant include a carboxylic acid such as stearic acid and oleic acid; an ester such as butyl stearate; a sulfonic acid such as octadecylsulfonic acid; a phosphoric acid ester such as monooctadecyl phosphate; an alcohol such as stearyl alcohol and oleyl alcohol; a carboxylic acid amide such as stearic acid amide; and an amine such as stearyl amine.

Examples of the fluorinated lubricant include lubricants obtained by replaing all or a part of alkyl groups of the above-mentioned hydrocarbon lubricants with a fluoroalkyl group or a perfluoropolyether group.

The perfluoropolyether group can be a perfluoromethylene oxide polymer, a perfluoroethylene oxide polymer, a perfluoro-n-propylene oxide polymer $(CF_2CF_2CF_2O)_n$, a perfluoroisopropylene oxide polymer $(CF(CF_3)CF_2O)_n$ or a copolymer thereof.

Also a compound having a polar functional group such as a hydroxyl group, an ester group or a carboxyl group at an end of the alkyl group or in the molecule of the hydrocarbon lubricant is preferable because it has a strong effect of reducing the frictional force.

The lubricant has a molecular weight within a range of 500 to 5,000, and preferably 1000 to 3,000. When the molecular weight is less than 500, such a lubricant has a high volatility and may has a low lubricity. On the other hand, when the molecular weight exceeds 5,000, such a lubricant has a high viscosity, and thus the slider and the disk easily stick to each other, eventually causing a stoppage of the disk running or a head crash.

More specifically, the perfluoropolyether is commercially available under trade names of FOMBLIN (Ausimont Inc.) and KRYTOX (DuPont de Nemeur).

Examples of the extreme-pressure additive include a phosphate ester such as trilauryl phosphate; a phosphite ester such as trilauryl phosphite; a thiophosphite ester and a thiophosphate ester such as trilauryl trithiophosphite; and a sulfur-containing extreme-pressure additive such as dibenzyl disulfide.

The lubricant mentioned above may be used alone or in combination. Such a lubricant can be applied to the magnetic layer or the protective film by dissolving the lubricant in an organic solvent and coating the resultant solution by wire bar coating, gravure coating, spin coating or dip coating, or by vacuum evaporation method.

Examples of the antirusting agent include a nitrogen-containing heterocyclic compound such as benzotriazole, benzoimidazole, purine and pyrimidine, and a derivative thereof obtained by introducing an alkyl side chain or the like into the main skeleton described above; and a nitrogen and sulfur-containing heterocyclic compound such as benzothiazole, 2-mercaptobenzothiazole, a tetrazaindene compound and a thiouracyl compound, and a derivative thereof.

In a case where the magnetic recording medium is a magnetic tape or the like, a backcoat layer (backing layer) may be provided, as explained in the foregoing, on a surface of the non-magnetic support which sufare does not bear the magnetic layer. The backcoat layer is formed by applying to the non-magnetic support surface with no magnetic layer a backcoat layer forming solution prepared by dispersing granular components such as an abrasive powder and an antistatic agent and a binder in a known organic solvent.

Various inorganic pigments or carbon black can be used as one of the granular components, and a resin such as nitrocellulose, phenoxy resin, polyvinyl chloride resin, and polyurethane can be used alone or in combination as the binder.

A layer of a known adhesive may also be provided on the surfaces on which the nanoparticle dispersion is to be coated or the backcoat layer is to be formed.

The magnetic recording medium thus produced has preferably a center line average height within a range of 0.1 to 5 nm, and more preferably 1 to 4 nm at a cut-off value of 0.25 mm. Such extremely high surface smoothness is preferable for a magnetic recording medium for a high density recording.

Such surface can be obtained by a method of conducting a calendering process after the magnetic layer is formed. Also a burnishing process may be conducted.

The obtained magnetic recording medium can be used after being punched with a puncher or cut into a desired size with a guillotine.

EXAMPLES

The present invention will be now explained by examples, but the invention is not limited to such examples.

Preparation of Nanoparticle Dispersion (1) Preparation of FePt nanoparticle dispersion (Dispersion I)

Following operations were carried out in highly pure argon gas.

0.64 mmol of iron (III) acetylacetonate [$CH_3COCH=C(O-)CH_3$]$_3$Fe, 1.5 mmol of 1,2-hexadecanediol (noble reducing agent), and 20 ml of dioctyl ether were mixed with each other and the resultant mixture was heated at 100° C.

Then 0.5 mmol of oleic acid and 0.5 mmol of oleylamine were added to the mixture and the resultant mixture was refluxed for 30 minutes at 200° C. (liquid A).

0.5 mmol of platinum (II) acetylacetonate [$CH_3COCH=C(O-)CH_3$]$_2$Pt, 1.5 mmol of 1,2-hexadecanediol and 20 ml of dioctyl ether were mixed with each other and the resultant mixture was heated at 100° C.

The liquid A which had been cooled to 100° C. was added to the mixture and the resultant mixture was refluxed for 30 minutes at 297° C. After cooling, 40 ml of ethanol were added to the reaction mixture, and, after the sedimentation of the precipitate, the supernatant liquid was removed.

0.16 mmol of oleic acid and 0.15 mmol of oleylamine were added to the precipitate, and the mixture was mixed with and dispersed in 25 ml of hexane. Then 20 ml of ethanol were added to the despersion, and the supernatant liquid was removed after the sedimentation of the precipitate.

0.16 mmol of oleic acid and 0.15 mmol of oleylamine were added to the precipitate, and the resultant mixture was mixed with and dispersed in 20 ml of hexane. Then 15 ml of ethanol were added to the despersion, and the supernatant liquid was removed after the sedimentation of the precipitate. 0.16 mmol of oleic acid and 0.15 mmol of oleylamine were added to the precipitate, and the resultant mixture was mixed with and dispersed in 20 ml of hexane to obtain a FePt nanoparticle dispersion (Dispersion I).

(2) Preparation of FePt nanoparticle dispersion (Dispersion II)

Following operations were executed in highly pure argon gas.

0.1 mmol of platinum (II) acetylacetonate [$CH_3COCH=C(O-)CH_3$]$_2$Pt, 0.64 mmol of iron (III) acetylacetonate [$CH_3COCH=C(O-)CH_3$]$_3$Fe, 1.5 mmol of 1,2-hexadecanediol, and 20 ml of dioctyl ether were mixed with each other and the resultant mixture was heated at 100° C.

Then 0.5 mmol of oleic acid and 0.5 mmol of oleylamine were added to the mixture and the resultant mixture was refluxed for 30 minutes at 200° C. (liquid B).

0.4 mmol of platinum (II) acetylacetonate [$CH_3COCH=C(O-)CH_3$]$_2$Pt, 1.5 mmol of 1,2-hexadecanediol and 20 ml of dioctyl ether were mixed with each other and the resultant mixture was heated at 100° C. The liquid was mixed with the liquid B which had been cooled to 100° C., and the mixture was refluxed for 30 minutes at 297° C. After cooling, 40 ml of ethanol were added to the reaction mixture, and, after the sedimentation of the precipitate, the supernatant liquid was removed.

0.16 mmol of oleic acid and 0.15 mmol of oleylamine were added to the precipitate, and the resultant mixture was mixed with and dispersed in 25 ml of hexane. Then 20 ml of ethanol were added to the dispersion, and the supernatant liquid was removed after the sedimentation of the precipitate.

0.16 mmol of oleic acid and 0.15 mmol of oleylamine were added to the precipitate, and the mixture was mixed with and dispersed in 20 ml of hexane. Then 15 ml of ethanol were added to the dispersion, and the supernatant liquid was removed after the sedimentation of the precipitate. 0.16 mmol of oleic acid and 0.15 mmol of oleylamine were added to the precipitate, and the resultant mixture was mixed with and dispersed in 20 ml of hexane to obtain a FePt nanoparticle dispersion (Dispersion II).

(3) Preparation of FePt nanoparticle dispersion (Dispersion III)

Following operations were executed in highly pure argon gas.

0.5 mmol of platinum (II) acetylacetonate [$CH_3COCH=C(O-)CH_3$]$_2$Pt, 1.5 mmol of 1,2-hexadecanediol, and 20 ml of dioctyl ether were mixed with each other and the resultant mixture was heated at 100° C.

Then 0.5 mmol of oleic acid, 0.5 mmol of oleylamine and 1 mmol of Fe(CO)$_5$ were added to the mixture and the resultant mixture was refluxed for 30 minutes at 297° C. After cooling, 40 ml of ethanol were added to the reaction mixture, and, after the sedimentation of the precipitate, the supernatant liquid was removed. The addition of Fe(CO)$_5$ was conducted in a glow box having a scrubber in the exhaust system.

0.16 mmol of oleic acid and 0.15 mmol of oleylamine were added to the precipitate, and the resultant mixture was mixed with and dispersed in 25 ml of hexane. Then 20 ml of ethanol were added to the dispersion, and the supernatant liquid was removed after the sedimentation of the precipitate.

0.16 mmol of oleic acid and 0.15 mmol of oleylamine were added to the precipitate, and the resultant mixture was mixed with and dispersed in 20 ml of hexane. Then 15 ml of ethanol were added to the dispersion, and the supernatant liquid was removed after the sedimentation of the precipitate. 0.16 mmol of oleic acid and 0.15 mmol of oleylamine were added to the precipitate, and the resultant mixture was added with and dispersed in 20 ml of hexane to obtain a FePt nanoparticle dispersion (Dispersion III).

Confirmation of Nanoparticles

The prepared nanoparticle dispersions were dried on a mesh for TEM observation to prepare specimens for TEM observation. The particle size of the specimens were measured with a Hitachi transmission electron microscope (TEM) whose acceleration voltage was 300 kV.

The observation confirmed nanoparticles in each of the nanoparticle dispersions (I) to (III) were of Fe—Pt nanoparticles and that the nanoparticles of each dispersion had a volume mean particle size of 5 nm.

An ICP (SPS1200A, manufactured by Seiko Instrument Inc.) was used to determine the atomic percentage of Pt in the entire nanoparticles. Obtained results are shown in Table 1.

Examples 1 and 2, and Comparative Example 1

The following operations were conducted in a N$_2$ atmosphere.

Both surfaces of a SiO$_2$/Si substrate were coated with each of the prepared nanoparticle dispersion (I) to (III) (nanoparticle content: 0.04 mg/ml) in an mount of 0.5 g/m$^2$ and the coating layers were dried. Then the coated supports were heated for 30 minutes in an electric furnace at an internal temperature of 550° C. to obtain a magnetic layer having a thickness of 0.1 μm. A magnetic recording media were thus obtained.

Evaluation of Characteristics (1) X-ray Diffraction

Specimens for X-ray diffraction were prepared from the aforementioned specimens which had been heated.

A Cu—Kα ray was generated by an X-ray diffractometer (Rigaku Denki Co.) under conditions of a bulb voltage of 50 kV and a bulb current of 300 mA, and X-ray diffraction was conducted by a powder method using a goniometer. A disordered phase and an ordered phase (tetragonal) were distinguished from each other according to the crystalline structure. Obtained results are shown in Table 1.

(2) Magnetic Characteristics

Coercive force of each magnetic recording medium was measured at an applied magnetic field of 790 kA/m (10 kOe) with a magnetization vector measuring apparatus having a high sensitivity and a data processing apparatus, both manufactured by Toei Kogyo Co. Obtained results are shown in Table 1.

TABLE 1

| | nanoparticle dispersion | iron source | Pt at. % | volume mean particle size | crystal structure | coercive force |
|---|---|---|---|---|---|---|
| Example 1 | (I) | iron(III)acetyl-acetonate | 44 | φ5 nm | tetragonal | 395 kA/m (5 kOe) |
| Example 2 | (II) | iron(III)acetyl-acetonate | 43 | φ5 nm | tetragonal | 434.5 kA/m (5.5 kOe) |
| Comp. Ex. 1 | (III) | Fe(CO)$_5$ | 42 | φ5 nm | tetragonal | 410.8 kA/m (5.2 kOe) |

Examples 1 and 2 could provide a high coercive force, as in the Comparative Example 1. Since Examples 1 and 2 did not use highly toxic Fe(CO)$_5$ which was used in Comparative Examples 1, Examples 1 and 2 do not require a ventilating facility or the like, thus suggesting a high productivity.

What is claimed is:

1. A method for producing nanoparticles having at least one of a CuAu type and Cu$_3$Au type magnetically hard ordered alloy phase, the method comprising the step of
    reducing, in liquid phase, a base metal and then reducing, in liquid phase, a noble metal,
    wherein the reducing step includes:
    adding a reducing agent having an oxidation-reduction potential lower than −0.2 V to a solution including the base metal so as to reduce the base metal; then adding, after the reduction, the solution including the base metal to a solution including the noble metal to obtain a mixture; and adding a reducing agent having an oxidation-reduction potential equal to or higher than −0.2 V to the obtained mixture so as to reduce the noble metal.

2. The method of claim 1, wherein the reducing agent having an oxidation-reduction potential equal to or higher than −0.2 V is selected from the group consisting of 1,2-hexadecanediol, 1,2-dodecanediol, a glycerin, H$_2$ and HCHO.

3. The method of claim 1, wherein the reducing agent having an oxidation-reduction potential lower than −0.2 V is selected from the group consisting of S$_2$O$_6^{2-}$, H$_2$PO$_2^-$, BH$_4^-$, N$_2$H$_5^+$ and H$_2$PO$_3^-$.

4. The method of claim 1, wherein the solution including the noble metal includes an adsorbing agent.

5. The method of claim 1, wherein the reducing step is conducted at a temperature within a range of from 40 to 360° C.

6. The method of claim 1, wherein an element selected from the group consisting of Sb, Pb, Bi, Cu, Ag and Zn is added to a binary alloy obtained in the reducing step.

7. A method for producing nanoparticles having at least one of a CuAu type and Cu$_3$Au type magnetically hard ordered alloy phase, the method comprising the step of:
    reducing, in liquid phase, a base metal and a part of a noble metal, and then reducing, in liquid phase, the remainder of the noble metal,
    wherein the reducing step includes:
    adding a reducing agent having an oxidation-reduction potential lower than −0.2 V to a solution including the base metal and the noble metal so as to reduce the base metal and a part of the noble metal; and adding a reducing agent having an oxidation-reduction potential equal to or higher than −0.2 V to the obtained mixture so as to reduce the remainder of the noble metal.

8. The method of claim 7, wherein the reducing agent having an oxidation-reduction potential equal to or higher than −0.2 V is selected from the group consisting of 1,2-hexadecanediol, 1,2-dodecanediol, a glycerin, H$_2$ and HCHO.

9. The method of claim 7, wherein the reducing agent having an oxidation-reduction potential lower than −0.2 V is selected from the group consisting of S$_2$O$_6^{2-}$, H$_2$PO$_2^-$, BH$_4^-$, N$_2$H$_5^+$ and H$_2$PO$_3^-$.

10. The method of claim 7, wherein the solution including the base metal and the noble metal includes an adsorbing agent.

11. The method of claim 7, wherein the reducing step is conducted at a temperature within a range of from 40 to 360° C.

12. The method of claim 7, wherein an element selected from the group consisting of Sb, Pb, Bi, Cu, Ag and Zn is added to a binary alloy obtained in the reducing step.

13. A method for producing nanoparticles having at least one of a CuAu type and Cu$_3$Au type magnetically hard ordered alloy phase, the method comprising the step of adding a reducing agent having at least one of S$_2$O$_6^{2-}$, H$_2$PO$_2^-$, BH$_4^-$, N$_2$H$_5^+$ and H$_2$PO$_3^-$ groups to a solution including a base metal to reduce the base metal, and then reducing, in liquid phase, a noble metal.

14. A method for producing a nanoparticles having at least one of a CuAu type and $Cu_3Au$ type magnetically hard ordered alloy phase, the method comprising the step of adding a reducing agent having at least one of $S_2O_6^{2-}$, $H_2PO_2^-$, $BH_4^-$, $N_2H_5^+$ and $H_2PO_3^-$ groups to a solution including a base metal and a noble metal to reduce the base metal and a part of the noble metal, and then reducing, in liquid phase, the remainder of the noble metal.

* * * * *